United States Patent
Zhu et al.

(10) Patent No.: US 8,711,125 B2
(45) Date of Patent: Apr. 29, 2014

(54) COORDINATE LOCATING METHOD AND APPARATUS

(75) Inventors: Xiuling Zhu, Tuen Mun (HK); Chenjung Tsai, Shatin (HK)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 657 days.

(21) Appl. No.: 12/955,226

(22) Filed: Nov. 29, 2010

(65) Prior Publication Data

US 2011/0116105 A1   May 19, 2011

Related U.S. Application Data

(63) Continuation-in-part of application No. 12/700,598, filed on Feb. 4, 2010.

(51) Int. Cl.
*G06F 3/042* (2006.01)
(52) U.S. Cl.
USPC ......... 345/175; 345/178; 178/18.09; 250/200
(58) Field of Classification Search
USPC ........ 345/173, 175, 178; 718/18.09; 250/200; 178/18.09
See application file for complete search history.

(56) References Cited

U.S. PATENT DOCUMENTS

| | | | | |
|---|---|---|---|---|
| 4,553,842 A | * | 11/1985 | Griffin | 356/621 |
| 4,811,004 A | * | 3/1989 | Person et al. | 345/175 |
| 4,820,050 A | * | 4/1989 | Griffin | 356/621 |
| 4,980,547 A | * | 12/1990 | Griffin | 250/221 |
| 4,990,901 A | * | 2/1991 | Beiswenger | 345/175 |
| 5,484,966 A | | 1/1996 | Segen | |
| 5,936,723 A | * | 8/1999 | Schmidt et al. | 356/152.3 |
| 7,538,894 B2 | * | 5/2009 | Kobayashi | 356/614 |
| 7,932,899 B2 | * | 4/2011 | Newton et al. | 345/175 |
| 8,338,725 B2 | * | 12/2012 | Fan et al. | 178/18.09 |
| 2005/0200613 A1 | * | 9/2005 | Kobayashi et al. | 345/175 |
| 2006/0232568 A1 | * | 10/2006 | Tanaka et al. | 345/175 |
| 2008/0068352 A1 | * | 3/2008 | Worthington et al. | 345/175 |
| 2008/0143682 A1 | | 6/2008 | Shim et al. | |
| 2009/0027694 A1 | * | 1/2009 | Kobayashi | 356/622 |

(Continued)

FOREIGN PATENT DOCUMENTS

CN    101609381 A    12/2009

*Primary Examiner* — Lun-Yi Lao
*Assistant Examiner* — Kelly B Hegarty
(74) *Attorney, Agent, or Firm* — Merchant & Gould P.C.

(57) ABSTRACT

A coordinate locating apparatus for locating at least one touch point on a plane and the method thereof are provided. The coordinate locating apparatus comprises: a first detecting unit, comprising a first light emitting element and a first light receiving element, arranged at a first location of the plane; a second detecting unit, comprising a second light emitting element and a second light receiving element, arranged at a second location of the plane; a first optical element arranged along an edge of the plane for reflecting and retro-reflecting light from the first and the second light emitting elements; and a second and third optical elements arranged along two edges of the plane for performing at least one of reflecting and retro-reflecting light from the first and the second light emitting elements or light reflected from the first optical element, both of the two edges being adjacent to the edge along which the first optical element is arranged, wherein the at least one touch point is located on the basis of the detected intensities of light received by the first and the second light receiving elements, and the detected intensities of light are compared with a first threshold and a second threshold.

11 Claims, 9 Drawing Sheets

(56) References Cited

U.S. PATENT DOCUMENTS

| | | | |
|---|---|---|---|
| 2009/0058833 A1* | 3/2009 | Newton | 345/175 |
| 2009/0066662 A1 | 3/2009 | Liu et al. | |
| 2009/0213093 A1* | 8/2009 | Bridger | 345/175 |
| 2009/0219256 A1* | 9/2009 | Newton | 345/173 |
| 2009/0277694 A1* | 11/2009 | Hansen et al. | 178/18.03 |
| 2009/0278816 A1* | 11/2009 | Colson | 345/175 |
| 2009/0295755 A1* | 12/2009 | Chapman et al. | 345/175 |
| 2010/0045629 A1* | 2/2010 | Newton | 345/173 |
| 2010/0309169 A1 | 12/2010 | Lieberman et al. | |
| 2011/0074735 A1* | 3/2011 | Wassvik et al. | 345/175 |
| 2011/0128218 A1* | 6/2011 | Kroeker et al. | 345/156 |
| 2011/0128219 A1* | 6/2011 | Sirotich et al. | 345/156 |
| 2011/0141062 A1* | 6/2011 | Yu et al. | 345/175 |
| 2011/0148758 A1* | 6/2011 | Hashimoto | 345/157 |
| 2011/0169727 A1* | 7/2011 | Akitt | 345/156 |
| 2011/0254809 A1* | 10/2011 | Yu et al. | 345/175 |
| 2012/0026084 A1* | 2/2012 | Suggs | 345/156 |
| 2012/0056807 A1* | 3/2012 | Chapman et al. | 345/158 |

* cited by examiner

COORDINATE LOCATING METHOD AND APPARATUS

This application claims benefit of Ser. No. 12/700,598, filed 4 Feb. 2010 in the United States and which application is incorporated herein by reference. To the extent appropriate, a claim of priority is made to each of the above disclosed applications.

FIELD OF THE INVENTION

The invention relates generally to a coordinate locating device and a coordinate locating method, and, more particularly, to a coordinate locating device capable of locating the coordinates of multiple objects and a coordinate locating method thereof.

BACKGROUND OF THE INVENTION

Various coordinate locating devices for locating the coordinates of an object are known. Some coordinate locating devices can detect the coordinates of an object from a pointing instrument, such as a pen, a fingertip, or a specific device for use with such devices. Accordingly, a user can input information with the pointing instrument.

Common techniques employed in conventional coordinate locating devices for locating the coordinates of an object include mechanical buttons, crossed light beams, acoustic surface waves, capacitance sensing, and resistive materials. Among these devices, those employing crossed light beams are not limited by the display panel size and are therefore cost competitive.

For example, Griffin, U.S. Pat. No. 4,820,050 discloses a solid-state optical position determining apparatus having an LED light source and an image sensor. However, the apparatus can only locate the coordinates of one object, resulting in undesirably limited applications.

Another example is an apparatus disclosed by Segen, U.S. Pat. No. 5,484,966, entitled "Sensing stylus position using single 1-D image sensor." The apparatus utilizes two mirrors and one image sensor, but can only locate the coordinate of one object.

To solve the problem with the above two conventional techniques, US Patent Publication. No. 2009/0,066,662 by Liu Yun-Cheng, et al. proposes a system capable of distinguishing multiple touch points, and US Patent Publication. No. 2008/0143682 by Shim, Yeon Shim, et al. also proposes a display device having a multi-touch recognition function. However, both require at least three image sensors, which greatly increases manufacturing costs.

To deal with the above drawbacks, U.S. patent application Ser. No. 12/700,598 provides a coordinate locating apparatus capable of locating the coordinates of multiple objects by utilizing only two detectors and a mirror to detect mirrored images of the objects, thereby reducing manufacturing costs. However, the complexity of calculation increases with the number of touch points to be located.

SUMMARY OF THE INVENTION

In view of above, a coordinate locating apparatus is provided which has the ability to locate the coordinates of two or more objects, costs less to manufacture than devices using conventional techniques, and reduces the complexity of calculation.

In one aspect, a coordinate locating apparatus for locating at least one touch point on a plane is provided. The coordinate locating apparatus comprises: a first detecting unit, comprising a first light emitting element and a first light receiving element, arranged at a first location of the plane; a second detecting unit, comprising a second light emitting element and a second light receiving element, arranged at a second location of the plane; a first optical element arranged along an edge of the plane for reflecting and retro-reflecting light from the first and the second light emitting elements; and a second and third optical elements arranged along two edges of the plane for performing at least one of reflecting and retro-reflecting light from the first and the second light emitting elements or light reflected from the first optical element, both of two edges being adjacent to the edge along which the first optical element is arranged, wherein the at least one touch point is located on the basis of detected intensities of light received by the first and the second light receiving elements, and the detected intensities of light are compared with a first threshold and a second threshold.

In another aspect, a coordinate locating method for locating at least one touch point on a plane is provided. The method comprises: generating a plurality of first signals corresponding to the intensities of light emitted by a first light emitting element and detected by a first light receiving element on different angles; generating a plurality of second signals corresponding to the intensities of light emitted by a second light emitting element and detected by a second light receiving element on different angles; obtaining a plurality of first candidate touch points on the basis of the comparison of the first signals with a first threshold and a second threshold; obtaining a plurality of second candidate touch points on the basis of the comparison of the second signals with the first threshold and the second threshold; and locating the at least one touch point on the basis of the overlap of the first and the second candidate touch points.

These and other features, aspects, and embodiments are described below in the section entitled "Detailed Description of the Invention."

BRIEF DESCRIPTION OF THE DRAWINGS

Features, aspects, and embodiments are described in conjunction with the attached drawings, in which.

DETAILED DESCRIPTION OF THE INVENTION

Figure 1:
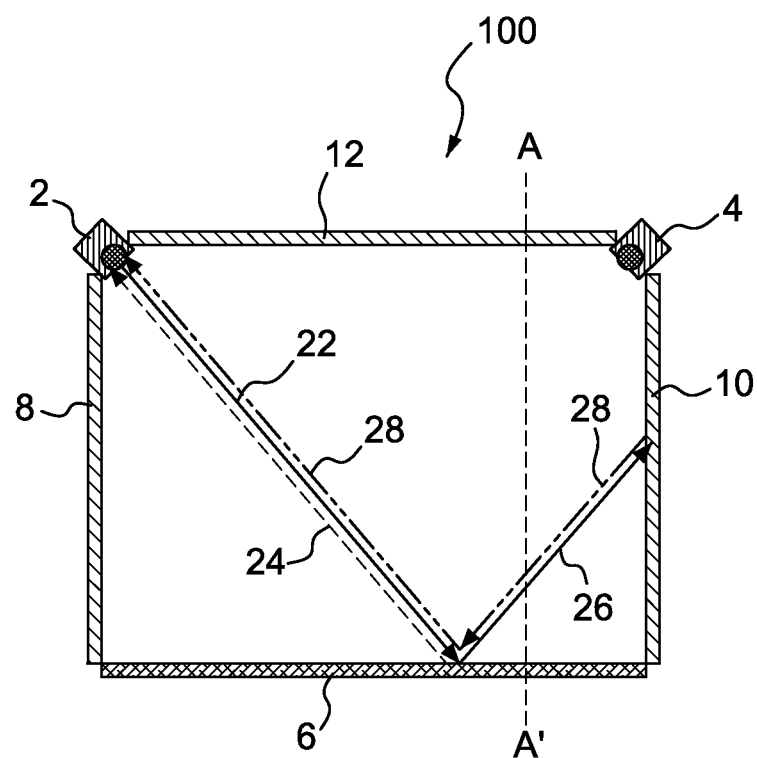
FIG. 1 is a schematic diagram showing the plane view of the structure of a coordinate locating apparatus in accordance with an embodiment.
Figure 2:
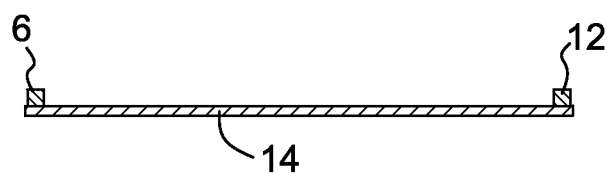
FIG. 2 is the cross section view of the coordinate locating apparatus along line AA' in FIG. 1.

FIG. 1 is a schematic diagram showing the plane view of the structure of a coordinate locating apparatus 100 in accordance with an embodiment. FIG. 2 shows the cross section view of the coordinate locating apparatus 100 along line AA' in FIG. 1. The coordinate locating apparatus 100 comprises the detecting units 2 and 4, the optical elements 6, 8, 10 and 12 (which may be omitted) and a processing unit (not shown in figure). The optical elements are arranged on the touch substrate of the coordinate locating apparatus 100. Take FIG. 2 as an example. The optical elements 6 and 12 are above the touch substrate 14.

Each of the detecting units 2 and 4 comprises a light emitting element and a light receiving element. The light emitting element is utilized to emit light at different angles. The light receiving element is utilized to receive light coming from different angles, and further generates signals on the basis of the intensities of the light coming from different angles. When a pointing instrument, such as a pen, a fingertip, or a specific device, touches a touch substrate (or touch panel), the light emitted to the touch point is blocked. That is to say, the intensity of the signal corresponding to the direction indicating the touch point is eliminated. Thus, the direction indicating the touch point can be detected by the light receiving element. Since the detecting units 2 and 4 both detect the directions indicating the touch point, the location of the touch point can be determined through the intersection of the two determined directions.

Figure 3A:
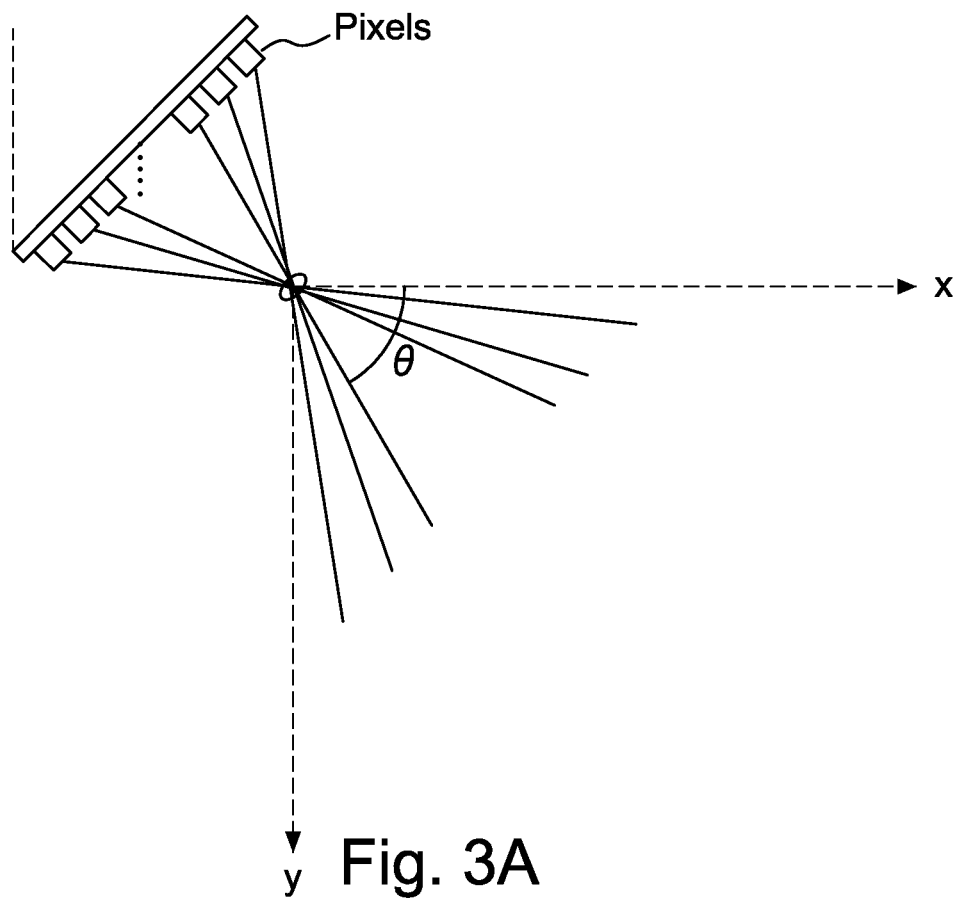
FIG. 3A is a diagram representing the relationship between pixel number and detection angle in the detecting unit implemented as an image sensor.
Figure 3B:
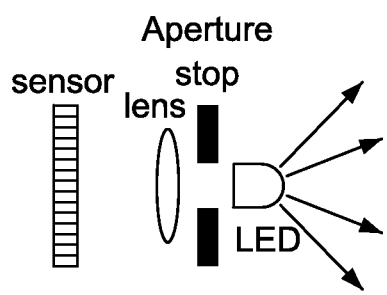
FIG. 3B is a schematic diagram of a conventional image sensor.

In a preferred embodiment, the detecting units 2 and 4 may be two laser scanning units, two image sensor units, or a laser scanning unit and an image sensor unit. Please refer to FIG. 3A, which is a diagram showing the operating of the image sensor. FIG. 3A depicts the relationship between pixel number and detection angle in the detecting unit implemented as an image sensor. The image sensor has a plurality of pixels, each configured to detect light intensity at a corresponding angle denoted as "θ." The signals representing the intensities of the light coming from different angles are generated on the basis of the detection result of each pixel. FIG. 3B illustrate a schematic diagram of a conventional image sensor. As depicted, the image sensor include a LED, an aperture stop, a lens and a sensor for receiving the light.

Figure 3C:
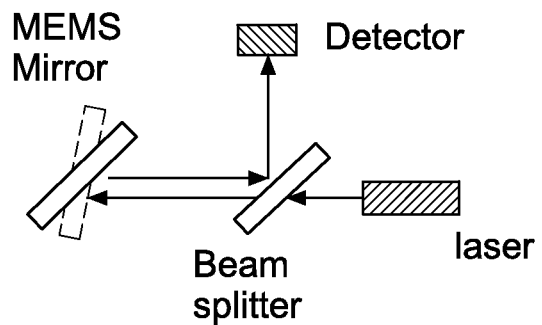
FIG. 3C is a schematic diagram of a conventional laser scanning unit.

The operation of the laser scanning unit is different from that of the image sensor. FIG. 3C is a schematic diagram of a conventional laser scanning unit. The laser scanning unit comprises a laser source, a beam splitter, a detector and a MEMS mirror. The angle of the light emitted by the laser scanning unit can be changed by rotating the MEMS mirror. Since the laser scanning unit is a conventional technique, the details of the operation of each component of the laser scanning unit are omitted. The applications of laser scanning units of different types are also omitted here, since persons skilled in the art can easily apply laser scanning units of different types to the present invention on the basis of general knowledge in this technical field.

Figure 4:
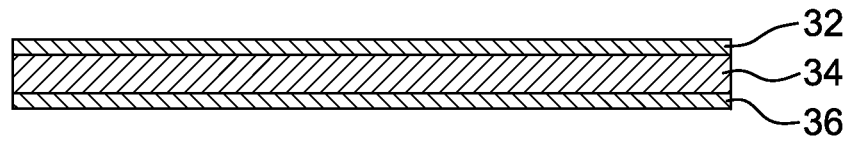
FIG. 4 is a side view of the coordinate locating apparatus in a preferred embodiment.

Please refer to FIG. 1 and FIG. 4. FIG. 4 illustrates a side view of the coordinate locating apparatus 100 of a preferred embodiment. In FIG. 4, the optical element 6 comprises two layers of retro-reflector 32 sandwiching a layer of mirror 34. In the preferred embodiment, the optical element 6 is arranged along an edge opposite to the edge connected by the corners on which the detecting units 2 and 4 locate, and the optical elements 8, 10 are retro-reflectors, and arranged adjacent to the optical element 6. In another embodiment, an optical element 12 may be arranged at the edge opposite the optical element 6, when necessary. The operation of the coordinate locating apparatus 100 of the preferred embodiment is depicted as FIG. 1. In FIG. 1, when a light beam is emitted along the path 22 from the detecting unit 2 to the first optical element 6, a part of the light beam is retro-reflected by the retro-reflectors 32 on the path 24, and a part of the light beam is reflected by o the mirror 34 to the optical element 10 along the path 26 and then retro-reflected by the third optical element 10 back to the image sensor along the path 28. Please note that the locations of the detecting units 2 and 4 and the composition of the optical element 6 is not limited by the above preferred embodiment. For example, the detecting units can be placed at anywhere along one edge of the plane. The optical element 6 may comprise a layer of retro-reflectors and a layer of mirror or the optical element 6 may comprise a plurality of retro-reflectors and a plurality of mirrors which are arranged alternately. All optical elements have at least one retro-reflector and at least one mirror capable of reflecting and retro-reflecting the light and so can serve as the optical element 6.

Figure 5A:
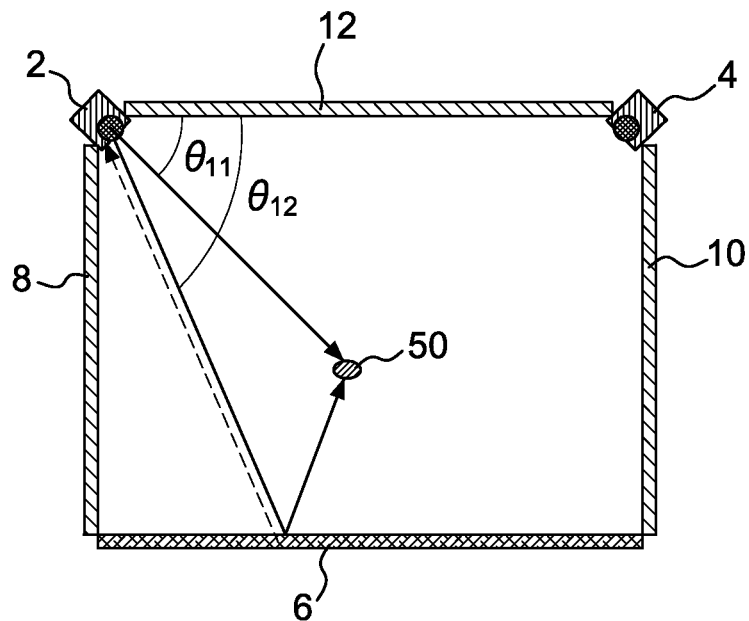
FIG. 5A is a diagram illustrating the operation of the detecting unit when a touch point exists.
Figure 5B:
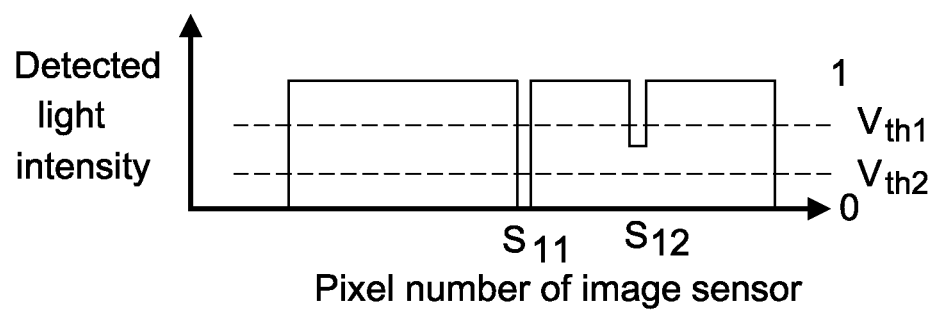
FIG. 5B is a diagram illustrating the signals generated by the receiving element of the detecting unit.

Please refer to FIGS. 5A and 5B. FIG. 5A illustrates the operation of the detecting unit 2 when a touch point exists. FIG. 5B illustrates the signals generated by the receiving element of the detecting unit 2. When a pointing instrument, such as a pen, a fingertip, or a specific device, touches the touch point 50, the light emitted at the angle $\theta_{11}$ is blocked at the touch point. Therefore, in FIG. 5B, the signal $S_{11}$ representing the light intensity received on the angle $\theta_{11}$ approximates zero. As to the light emitted at the angle $\theta_{12}$, a part of energy of the light is retro-reflected to the detecting unit 2 by the retro-reflector of the optical element 6, and the rest energy is reflected by the mirror of the optical element 6 and then blocked at the touch point. Therefore, in FIG. 5B, the magnitude of signal $S_{12}$ representing the light intensity received at the angle $\theta_{12}$ is between magnitude of the signal $S_{11}$ and those of other signals. In the preferred embodiment, two thresholds Vth1 and Vth2 are employed to classify the signals. It is determined that a real object is detected in a certain direction if the intensity of the signal corresponding to the direction is lower than the threshold Vth2. It is determined that an image of the object is detected in a certain direction if the intensity of the signal corresponding to the direction is lower than the threshold Vth1 but higher than the threshold Vth2. In FIG. 5B, the detecting unit 2 is an image sensor. The x-axis of the plot denotes the pixel number of the image sensor. Each pixel configured to detect light intensity at a corresponding angle denoted as "θ." That is to say, the signals in FIG. 5B representing the intensities of the light coming from different angles are generated on the basis of the detection result of each pixel. If the detecting unit 2 is a laser scanning units, the x-axis of the plot in FIG. 5B would be changed to denotes the time. Since the scanning speed of the laser scanner is predetermined, the intensities of the light coming from different angles is obtained according to the time points at which the signals are detected and the predetermined scanning speed.

Figure 6A:
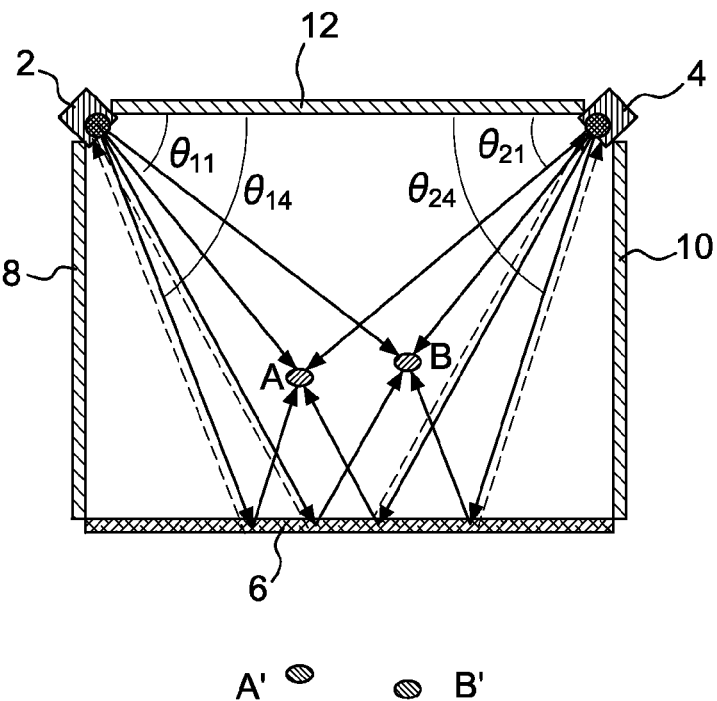
FIG. 6A is a diagram illustrating the operation of the coordinate locating apparatus when two touch points exist.
Figure 6B:
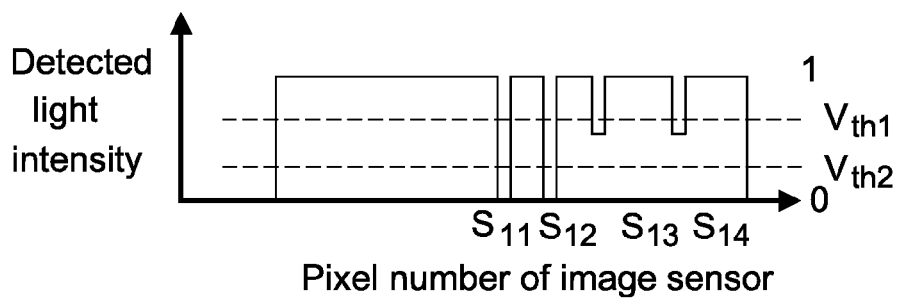
FIG. 6B is a diagram illustrating the signals generated by the receiving element of a detecting unit.
Figure 6C:
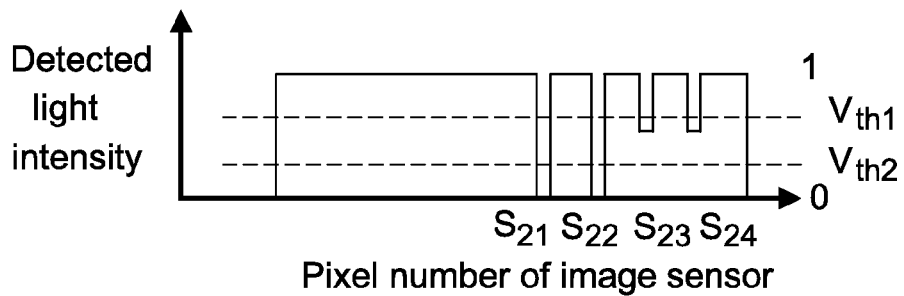
FIG. 6C is a diagram illustrating the signals generated by the receiving element of the other detecting unit.

Please refer to FIGS. 6A, 6B and 6C. FIG. 6A illustrates the operation of the coordinate locating apparatus 100 when two touch points exist. FIG. 6B illustrates the signals generated by the receiving element of the detecting unit 2. FIG. 6C illustrates the signals generated by the receiving element of the detecting unit 4. It can be seen that, in detecting unit 2, signal $S_{11}$ means that the object at touch point B is detected; signal $S_{12}$ means that the object at touch point A is detected; signal $S_{13}$ means that the image of the object on B' is detected; and signal $S_{14}$ means that the image of the object on A' is detected. As to detecting unit 4, signal $S_{21}$ means that the object at touch point A is detected; signal $S_{22}$ means that the object at touch point B is detected; signal $S_{23}$ means that the image of the object on A' is detected; and signal $S_{24}$ means that the image of the object on B' is detected.

Figure 7A:
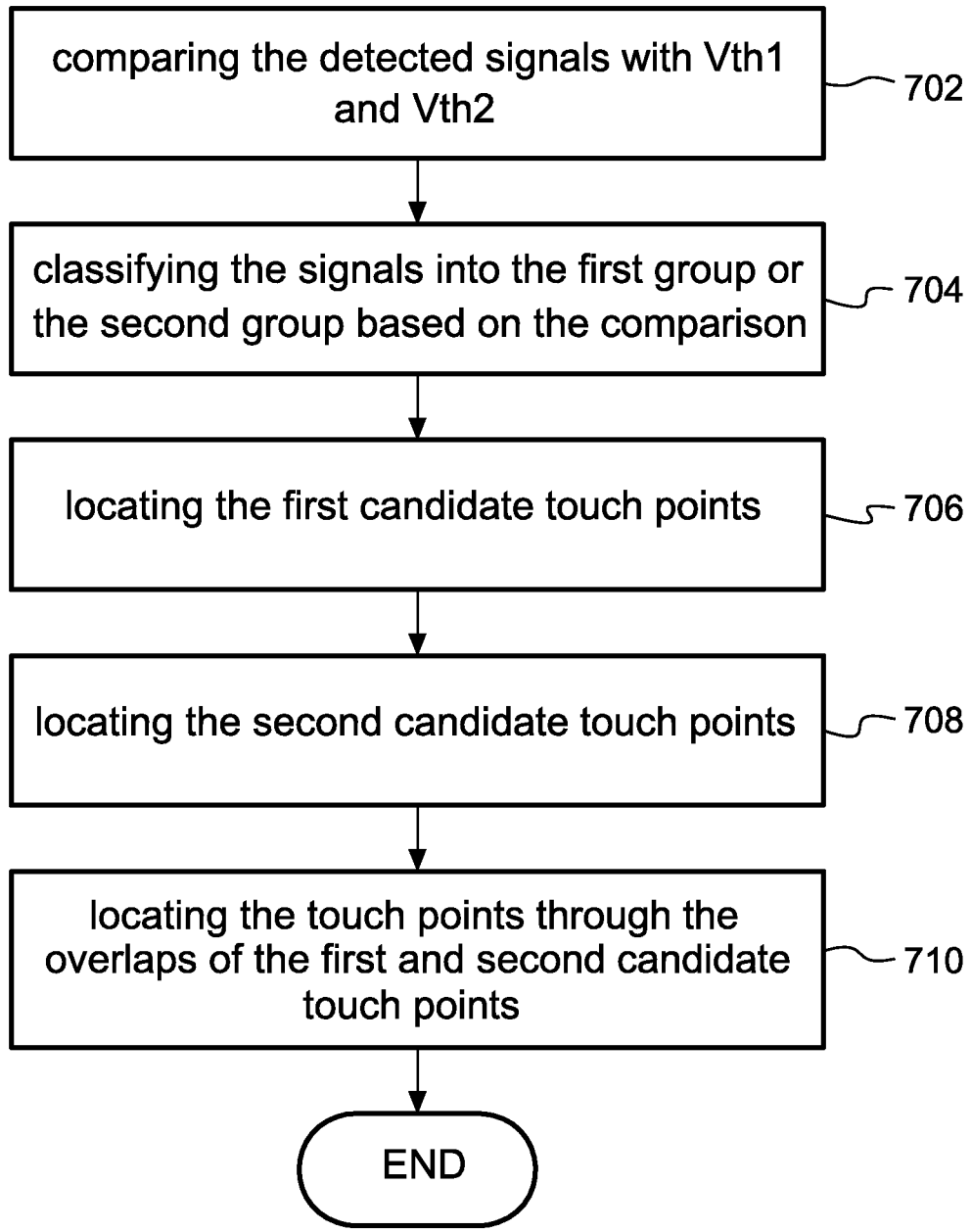
FIG. 7A is the flow chart of the coordinate locating method according to a preferred embodiment.

FIG. 7A illustrates a flow chart of the coordinate locating method of a preferred embodiment. When the signals are generated by the detecting units 2 and 4, the processing unit, electrically connected to the detecting units 2 and 4, compares each signal with the thresholds Vth1 and Vth2 (step 702). Signals with intensities lower than the threshold Vth2 are classified into a first group, and signals with intensities lower than the threshold Vth1 and greater than the threshold Vth2 is classified into a second group (step 704). The signals in the first group indicate that a real object is detected at the angle represented by the signals. The signals in second group indicate that an image of the object is detected at the angle represented by the signals.

Figure 7B:
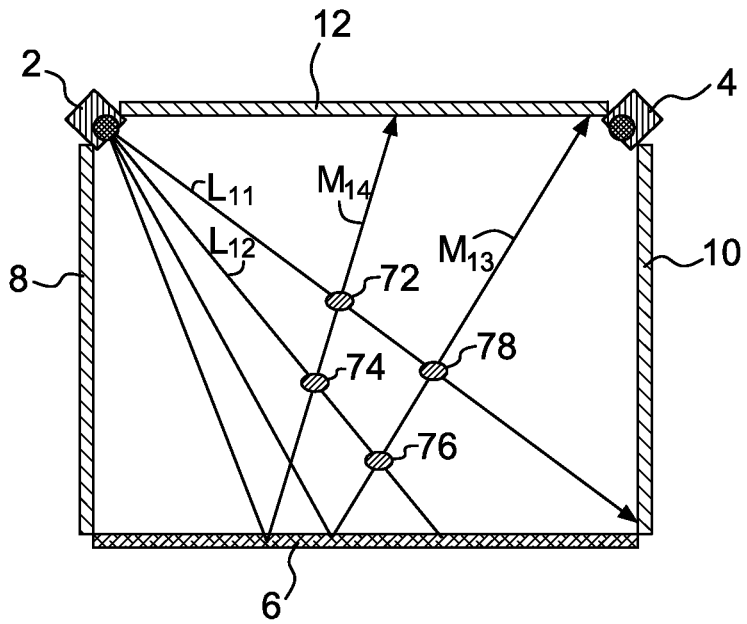
FIG. 7B is a diagram illustrating the locating of the first candidate touch points.
Figure 7C:
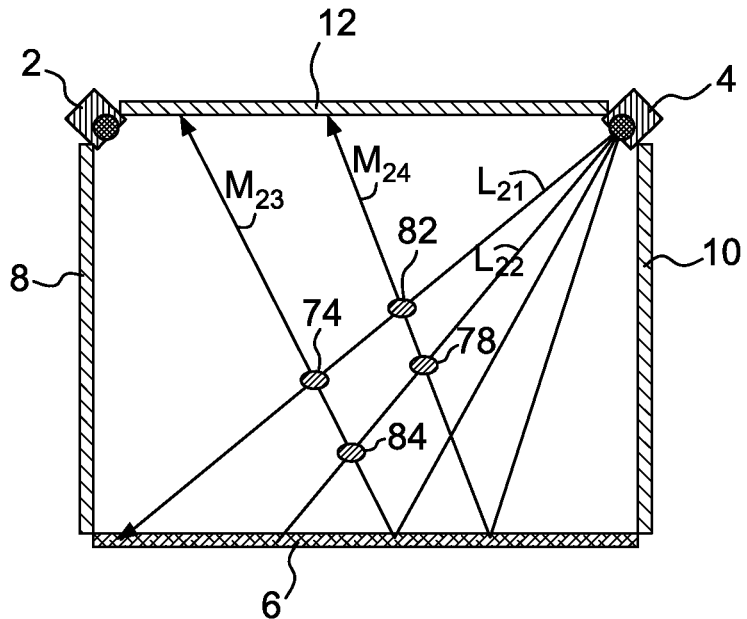
FIG. 7C is a diagram illustrating the locating of the second candidate touch points.

In FIG. 7A, after the step of grouping, a plurality of first candidate touch points 72, 74, 76 and 78 is obtained on the basis of the signals generated by the detecting unit 2 (step 706). Please refer to FIG. 7B. The signals in the first group with intensity lower than the threshold Vth2 can be utilized to determine the light paths $L_{11}$-$L_{12}$. Light paths $L_{11}$-$L_{12}$ are substantial straight lines, and are the paths of light directly blocked by objects at the touch points. The signals in the second group with intensities lower than the threshold Vth1 and higher than the threshold Vth2 can be utilized to determine the light paths $M_{13}$-$M_{14}$. Light paths $M_{13}$-$M_{14}$ relate to the paths of light emitted from the detecting unit 2, then reflected by the mirror of the optical element 6, and finally blocked by the objects. The intersections of the light paths $L_{11}$-$L_{12}$ and light paths $M_{13}$-$M_{14}$ are determined as the first candidate touch points 72, 74, 76 and 78.

In the same manner, a plurality of second candidate touch points 74, 78, 82 and 84 can be obtained on the basis of the signals generated by the detecting unit 4 (step 708). After the first candidate touch points 72, 74, 76 and 78 and the second candidate touch points 82, 74, 86 and 78 are determined, the touch points A and B can be determined through the overlaps 74 and 78 of the first candidate touch points 72, 74, 76 and 78 and the second candidate touch points 74, 78, 82 and 84 (step 710).

Figure 8A:
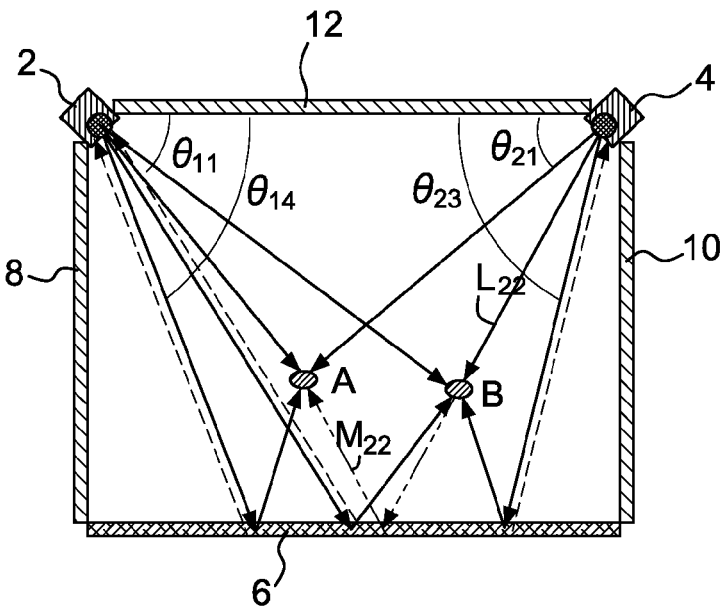
FIG. 8A is a diagram illustrating another operation of the coordinate locating apparatus when two touch points exist.
Figure 8B:
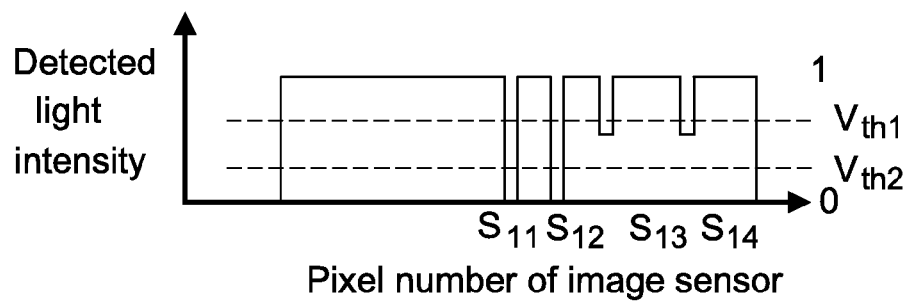
FIG. 8B is a diagram illustrating the signals generated by the receiving element of a detecting unit.
Figure 8C:
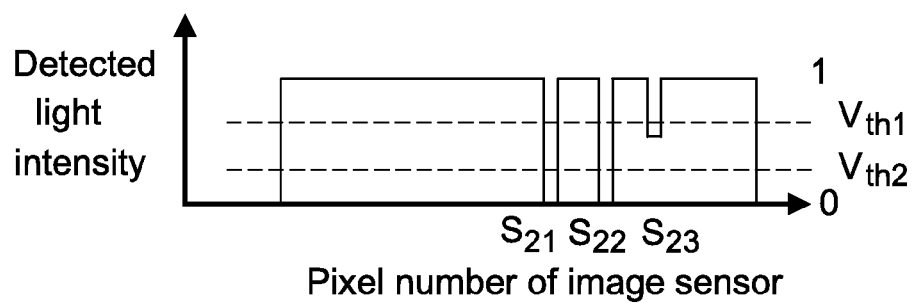
FIG. 8C is a diagram illustrating the signals generated by the receiving element of the other detecting unit.

However, under certain conditions, the above method cannot locate all the existing touch points. Please refer to FIGS. 8A, 8B and 8C. In FIG. 8A, four paths can be determined on the basis of the signals generated by detecting unit 2 as in FIG. 6A. However, only three paths can be determined on the basis of the signals generated by detecting unit 4, as shown in FIG. 8C, because the reflecting path to the touch point A is in the shadow of touch point B when seen from the detecting unit 4.

Figure 9A:
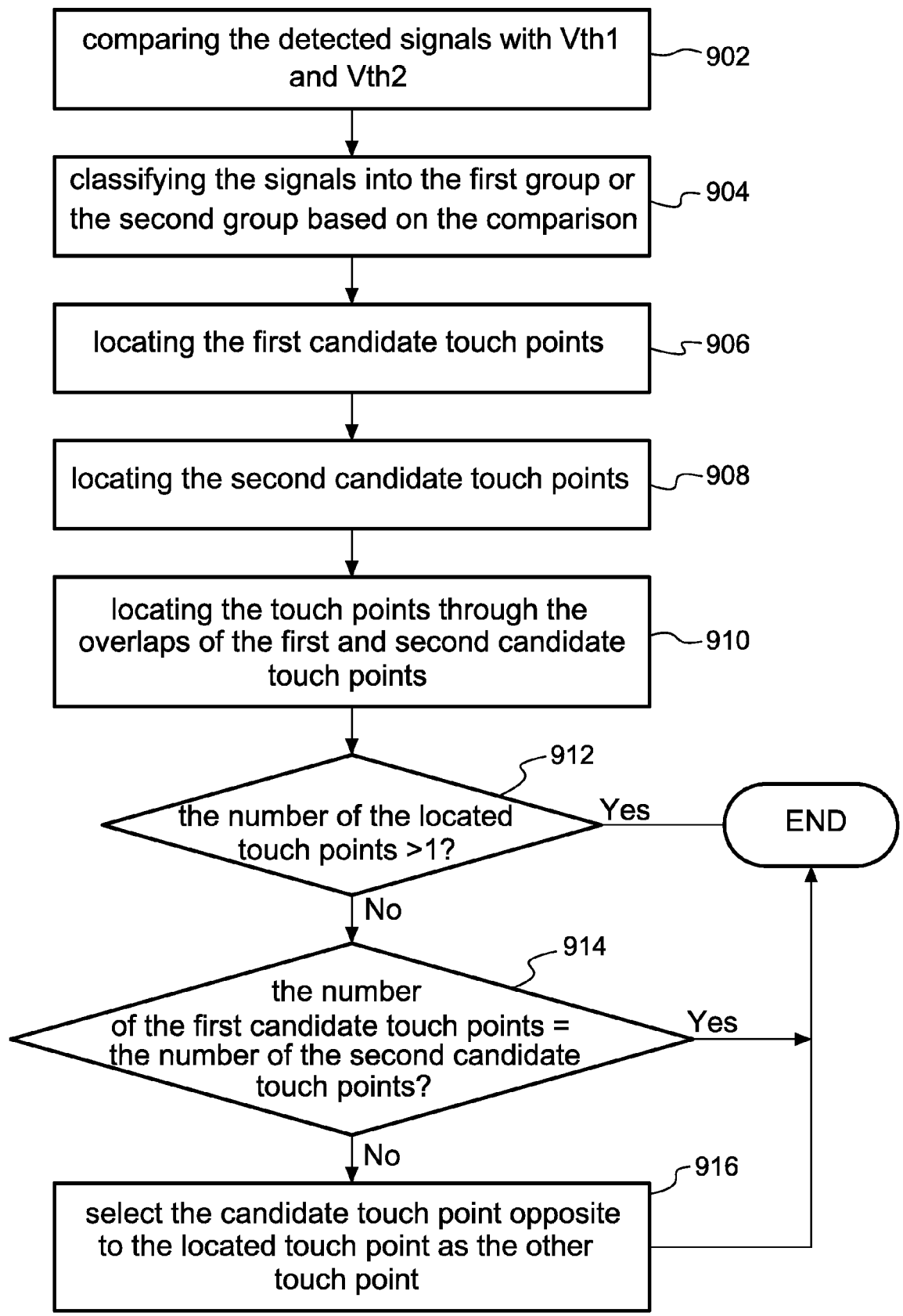
FIG. 9A is a flow chart of the coordinate locating method according to another preferred embodiment.
Figure 9B:
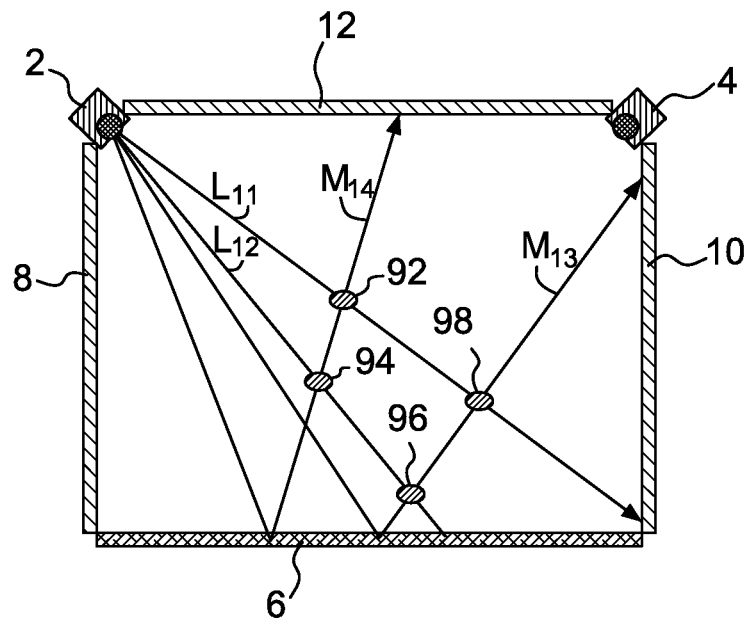
FIG. 9B is a diagram illustrating the locating of the first candidate touch points according to the another preferred embodiment.
Figure 9C:
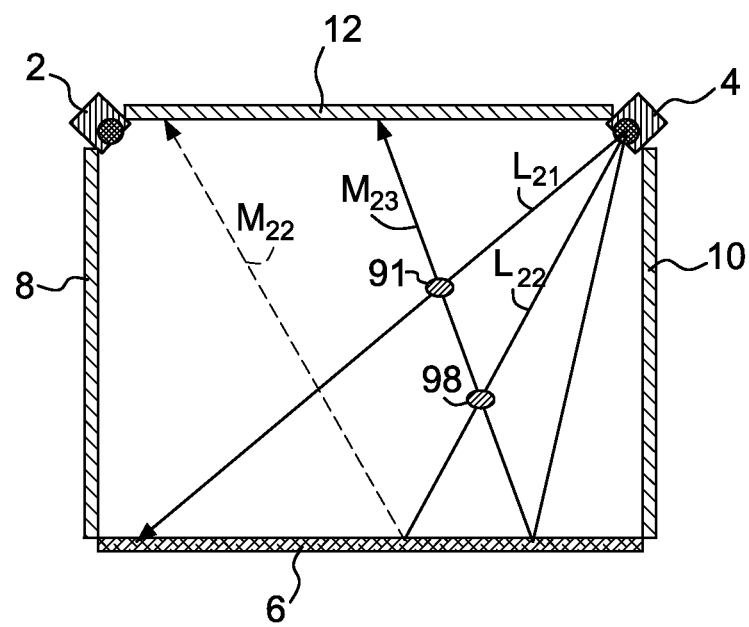
FIG. 9C is a diagram illustrating the locating of the second candidate touch points according to the another preferred embodiment.

To overcome the problem mentioned above, another preferred embodiment of the coordinate locating method of the present invention is provided in FIG. 9A. The steps 902, 904, 906, 908 and 910 in FIG. 9A are the same as the steps 702, 704, 706, 708 and 710 in FIG. 7A. After the first five steps are executed, if only one touch point is located after the overlap determination (step 912), the method in FIG. 9A further compares the number of the candidate touch points generated from the signals of the detecting unit 2 and that of the candidate touch points generated from the signals of the detecting unit 4 (step 914). If the numbers are different, the candidate touch point opposite to the touch point located is selected as the other touch point (step 916). As depicted in FIGS. 9B and 9C, the overlap of the first candidate touch points 92, 94, 96 and 98 and the second candidate touch points 91 and 98 is the candidate touch point 98. Thus, the candidate touch point 94 opposite to the candidate touch point 98 is selected as the other touch point.

Compared with conventional techniques which need to use three or more detectors, the coordinate locating apparatus in the present invention can locate the coordinates of multiple objects by utilizing only two detectors and an optical element capable of retro-reflecting and reflecting light to detect mirrored images of the objects, and thus costs less to manufacture. Furthermore, the signals corresponding to the object are distinguished from the signals corresponding to the image of the object with two thresholds, since the optical element has at least one retro-reflector and at least one mirror. The complexity of calculation is significantly reduced compared with the U.S. patent application Ser. No. 12/700,598. In other words, fast touch response speed and lower cost of calculation hardware are achieved.

Although the optical elements 8, 10 and 12 are retro-reflectors and the optical element 6 has two retro-reflectors 32 and a mirror 34 in the preferred embodiment mentioned above, the arrangement of the optical elements is not limited by the preferred embodiment. For example, in another embodiment, the optical elements 8 and 10 can be retro-reflectors, o mirrors or the combination thereof, and each of the optical element 6 and 12 has at least one retro-reflector and at least one mirror; in another embodiment, the optical elements 6 and 8 can be retro-reflectors, mirrors or the combination thereof, and each of the optical element 10 and 12 has at least one retro-reflector and at least one mirror. Since persons having general knowledge in the technical field can derive the appropriate thresholds according to the arrangement of the optical elements, the details of the embodiments mentioned above can be derived from the disclosure of the specification of the subject application.

While some embodiments have been described above, it will be understood that the embodiments are examples only. Accordingly, the device and methods described herein should not be limited to the specific embodiments, and should be interpreted on the basis of the claims that follow in combination with the above description and the accompanying drawings.

What is claimed is:

1. A coordinate locating apparatus for locating at least one touch point on a plane, comprising:

a first detecting unit, comprising a first light emitting element and a first light receiving element, arranged at a first location of the plane;

a second detecting unit, comprising a second light emitting element and a second light receiving element, arranged at a second location of the plane;

a first optical element arranged along an edge of the plane for reflecting and retro-reflecting light from the first and the second light emitting elements; and a second and third optical elements arranged along two edges of the plane for performing at least one of reflecting and retro-reflecting light from the first and the second light emitting elements or light reflected from the first optical element, both of the two edges being adjacent to the edge along which the first optical element is arranged, wherein the at least one touch point is located on the basis of the signals corresponding to detected intensities of light received by the first and the second light receiving elements, and the signals are classified into a first group of signals and a second group of signals by comparing the detected intensities of light with a first threshold and a second threshold, the first group of signals corresponding to intensities lower than the second threshold and the second group of signals corresponding to intensities lower than the first threshold but higher than the second threshold.

2. The coordinate locating apparatus of claim 1, wherein the first location is at a first corner of the plane.

3. The coordinate locating apparatus of claim 1, wherein the second location is at a second corner of the plane.

4. The coordinate locating apparatus of claim 1, wherein the first optical element is arranged along the edge opposite to an edge connected by the first and the second locations.

5. The coordinate locating apparatus of claim 4, wherein a fourth optical element is arranged on the edge connected by the first and the second locations.

6. The coordinate locating apparatus of claim 1, further comprising a processing unit electrically connected to the first and second detecting units, wherein the processing unit determines that a real object is detected when the detected intensity of light is lower than the second threshold, and the processing unit determines that an image of the object is detected when the detected intensity of light is lower than the first threshold and higher than the second threshold.

7. The coordinate locating apparatus of claim 1, wherein a plurality of first candidate touch points and a plurality of second candidate touch points are obtained on the basis of the first and the second thresholds, respectively, and the at least one touch point is located on the basis of the overlap of the first and the second candidate touch points.

8. The coordinate locating apparatus of claim 1, wherein the first optical element comprises a retro-reflector for retro-reflecting light and a mirror for reflecting light.

9. The coordinate locating apparatus of claim 1, wherein the second optical element and the third optical element are retro-reflectors, mirrors or the combination thereof.

10. The coordinate locating apparatus of claim 1, wherein at least one of the second and the third optical elements comprises a retro-reflector for retro-reflecting light and a mirror for reflecting light.

11. The coordinate locating apparatus of claim 1, wherein the first and second detecting units are laser scanning units, image sensor units, or the combination thereof.

* * * * *